July 30, 1968 M. A. PHILLIPS ET AL 3,394,813
DE-ICING AND ICE PREVENTION IN FILTERS
Filed Sept. 30, 1966

United States Patent Office 3,394,813
Patented July 30, 1968

3,394,813
DE-ICING AND ICE PREVENTION IN FILTERS
Milton Arnold Phillips and Owen Cyrus Redmon, Tulsa, Okla., assignors to Fram Corporation, Providence, R.I., a corporation of Rhode Island
Filed Sept. 30, 1966, Ser. No. 583,241
1 Claim. (Cl. 210—149)

ABSTRACT OF THE DISCLOSURE

Liquid filter is de-iced by withdrawing a small portion of fluid from the filter outlet, heating it, and returning it to the filter.

---

This invention relates to a method and apparatus for prevention of icing in and de-icing liquid filters and hydrocarbon-water separator filters.

The objects of the invention are to prevent filter separator cartridge rupture at startup due to increased viscosity of the hydrocarbon-water mixture at low temperatures, to prevent the freezing of water retained in the cartridges while the filter or separator is not being used, and to melt ice crystals in the mixture in order to keep cartridges from plugging.

As the invention is applicable to liquid filters, liquid separators, and separator/filters, the term "filter" will hereinafter be applied generically to refer to any of the units with which the invention is useful.

The invention features a circulation heater through which is pumped a small portion of the filtered hydrocarbon from the outlet of the filter and the return of that heated portion to the inlet thereof. The invention is used whether or not the separator is being operated, and includes the method of ice-prevention or de-icing, performed by the apparatus.

Figure 1:
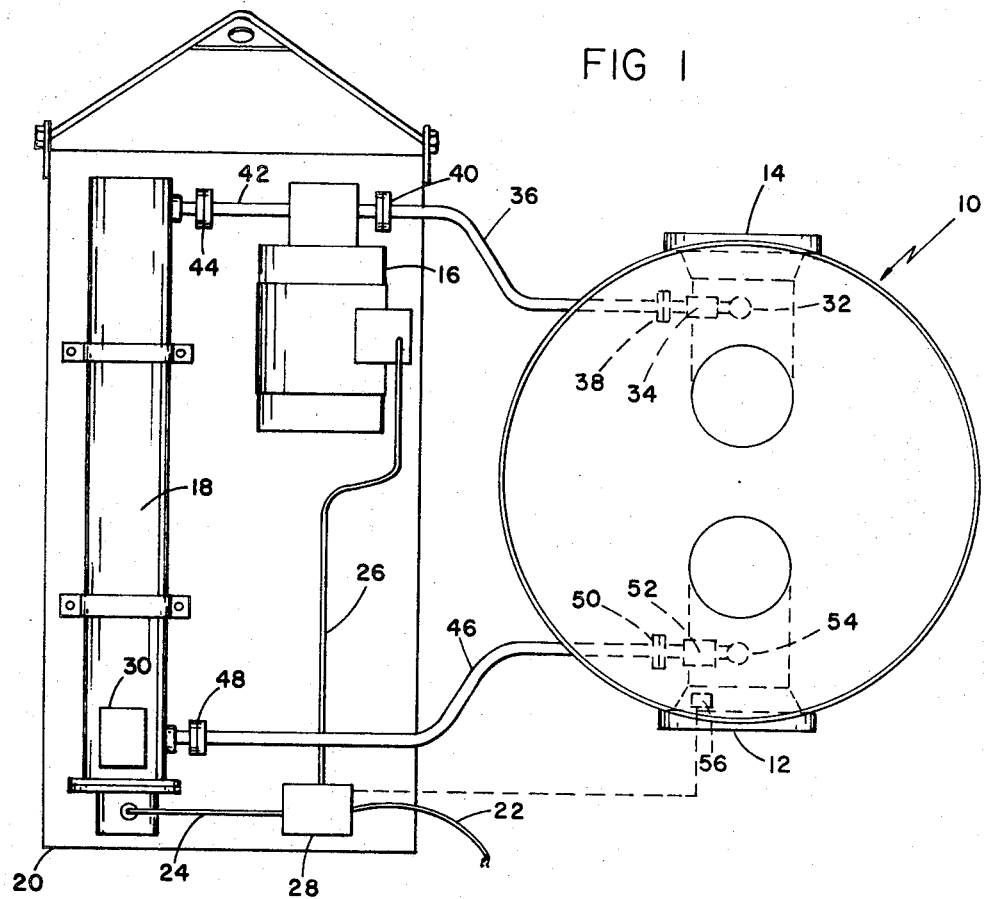
Figure 2:
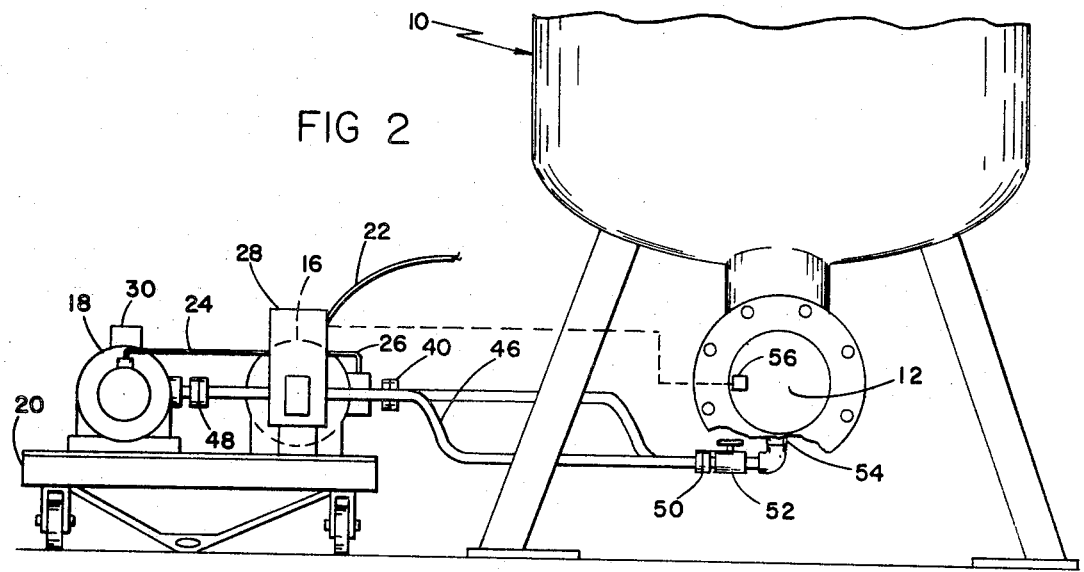

Other objects, features and advantages will appear from the following description of a preferred embodiment of apparatus for practicing the invention, taken together with accompanying drawings, in which:

FIG. 1 is a plan view of a separator/filter and a trailer-mounted circulating unit for practicing the invention; and FIG. 2 is a front elevation view thereof.

There is shown in the drawings the tank 10 of a fuel oil-water separator/filter. The tank 10 has an inlet 12 and an outlet 14.

An electrically operated pump 16 and an electrically operated circulation heater 18 are mounted on a trailer 20 which is along side the separator/filter. Electric power cords 22, 24 and 26 are connected to the pump 16, to the heater 18, and to the controller 28. A thermostat 30 is mounted on the heater 18.

An outlet drain 32 with a shut-off valve 34 is located at the outlet 14 of the tank 10. A flexible hose 36 runs from the hose union 38 located near the outlet shut-off valve 34 to the hose union 40 on the input side of pump 16. A flexible hose 42 runs from the outlet of the pump 16 to a hose union 44 at the inlet of the heater 18. Flexible hose 46 connects the outlet of the heater 18 to the hose union 50 which is located adjacent to the inlet shut-off valve 52 and the inlet drain 54 of the tank 10.

In operation, fuel oil is available at the outlet 14 of the separator/filter tank 10. The invention may be used whether the separator/filter is being operated or not. A small portion of the filtered fuel oil is pumped from the outlet 14 through hoses 36 and 42 to the inlet of the heater 18. There the fuel oil is heated and then continues out the outlet of the heater 18 through hose 46 to the inlet 12 of the separator/filter tank 10.

The pump 16 and circulation heater 18 are electrically operated and their operation controlled by the manual control 28. Optionally, a thermostat 56 can be installed on the separator/filter to sense the temperature of the incoming oil. When the oil is above freezing, the pumping-heating unit is turned off by the thermostat as there is no need of heat to prevent icing. The thermostat is connected suitably to the controller 28 to activate it in accordance with the temperature sensed. Closing the shut-off valves 34 and 52 allows detachment of the warm fuel circulator for use with another separator/filter. The circulator apparatus is mounted on a movable trailer 20 so that after being detached from one separator/filter it may easily be moved to a location near another one.

Other embodiments will occur to those skilled in the art and are within the following claim.

What is claimed is:

1. In a liquid filter apparatus having an inlet for a flow of impurity-bearing liquid, a filter for removing the impurities from the liquid and an outlet for filtered liquid, that improvement comprising
    a pump,
    a circulation heater,
    a main outlet conduit connected to communicate with said outlet to carry a large portion of said filtered fluid,
    a secondary restricted outlet conduit connected to communicate with said outlet to carry a small portion of said filtered fluid,
    said secondary outlet being connected to the inlet of said pump and heater,
    another restricted conduit connecting the outlet of said heater to said filter apparatus inlet so that a small portion of clean liquid is heated and returned to pass through the filter a second time,
    a thermostat arranged to sense the temperature of liquid in the filter inlet, and
    a controller actuated by said thermostat for starting and stopping the flow in said restricted conduits.

References Cited

UNITED STATES PATENTS

| | | | |
|---|---|---|---|
| 1,962,463 | 6/1934 | Renfrew | 210—181 X |
| 2,066,348 | 1/1937 | Hays | 210—181 |
| 2,073,847 | 3/1937 | Miller | 210—149 |
| 2,324,763 | 7/1943 | Carruthers | 210—74 X |
| 2,425,848 | 8/1947 | Vawter | 210—181 X |
| 2,426,817 | 9/1947 | Charlton et al. | 210—181 X |
| 2,428,486 | 10/1947 | De Purot | 210—181 |
| 2,552,452 | 5/1951 | Phillips | 210—177 |
| 2,729,338 | 1/1956 | Heigl | 210—71 X |
| 2,939,582 | 6/1960 | Giles | 210—186 X |
| 3,052,358 | 9/1962 | Stoermer | 210—181 |

REUBEN FRIEDMAN, *Primary Examiner.*

J. ADEE, *Assistant Examiner.*